US010908780B2

(12) United States Patent
Yamashita et al.

(10) Patent No.: US 10,908,780 B2
(45) Date of Patent: Feb. 2, 2021

(54) IMAGE OUTPUT DEVICE, METHOD OF CONTROLLING IMAGE OUTPUT DEVICE, AND TELEVISION

(71) Applicant: PANASONIC INTELLECTUAL PROPERTY MANAGEMENT CO., LTD., Osaka (JP)

(72) Inventors: Ken Yamashita, Nara (JP); Takeshi Yamada, Osaka (JP); Tatsuya Fujimoto, Hyogo (JP)

(73) Assignee: PANASONIC INTELLECTUAL PROPERTY MANAGEMENT CO, LTD., Osaka (JP)

( * ) Notice: Subject to any disclaimer, the term of this patent is extended or adjusted under 35 U.S.C. 154(b) by 0 days.

(21) Appl. No.: 16/470,508

(22) PCT Filed: Jun. 19, 2018

(86) PCT No.: PCT/JP2018/023206
§ 371 (c)(1),
(2) Date: Jun. 17, 2019

(87) PCT Pub. No.: WO2019/106867
PCT Pub. Date: Jun. 6, 2019

(65) Prior Publication Data
US 2020/0117320 A1    Apr. 16, 2020

(30) Foreign Application Priority Data

Nov. 30, 2017  (JP) .................................. 2017-230032

(51) Int. Cl.
*G06F 3/0482* (2013.01)
*G06F 3/0481* (2013.01)

(52) U.S. Cl.
CPC ........ *G06F 3/0482* (2013.01); *G06F 3/04817* (2013.01)

(58) Field of Classification Search
CPC .......................... G06F 3/0482; G06F 3/04817
See application file for complete search history.

(56) References Cited

U.S. PATENT DOCUMENTS 5,581,686 A * 12/1996 Koppolu ............... G06F 3/0481
715/784
7,191,411 B2 * 3/2007 Moehrle ............... G06F 3/0482
715/855

(Continued)

FOREIGN PATENT DOCUMENTS

JP        4051310 B2    2/2008
WO    2014/006946 A1   1/2014

OTHER PUBLICATIONS

International Search Report and Written Opinion dated Jul. 24, 2018 in International Patent Application No. PCT/JP2018/023206; with English translation.

(Continued)

*Primary Examiner* — Jung-Mu T Chuang
(74) *Attorney, Agent, or Firm* — McDermott Will and Emery LLP

(57) ABSTRACT

An image output device includes an instruction receiver, an image generator, an image controller, a storage that stores application information, and an updater that updates the application information. The image controller selects, with reference to the application information, from among the plurality of shortcuts, at least one first shortcut satisfying a first criterion and a second shortcut not satisfying the first criterion but satisfying a second criterion. The image generator generates and outputs the home menu in which the at least one first shortcut selected is displayed and the second shortcut selected is displayed in a different form than the at least one first shortcut.

6 Claims, 9 Drawing Sheets

(56) References Cited

U.S. PATENT DOCUMENTS

| | | | |
|---|---|---|---|
| 7,509,679 B2* | 3/2009 | Alagna | G06F 21/56 705/75 |
| 7,570,943 B2* | 8/2009 | Sorvari | H04M 1/72561 455/414.1 |
| 7,735,021 B2* | 6/2010 | Padawer | H04M 1/72547 715/810 |
| 8,745,617 B1* | 6/2014 | Stekkelpak | G06F 9/44505 717/178 |
| 9,510,141 B2* | 11/2016 | Soto Matamala | G06F 16/9537 |
| 9,942,358 B2* | 4/2018 | Babu | H04L 67/36 |
| 10,007,394 B2* | 6/2018 | Ku | G06F 3/04817 |
| 10,019,133 B1* | 7/2018 | McNeill | H04L 51/32 |
| 10,048,859 B2* | 8/2018 | Wang | G06F 3/0482 |
| 10,095,375 B2* | 10/2018 | van Os | G06F 3/04817 |
| 10,560,816 B2* | 2/2020 | Sohn | H04W 4/50 |
| 2002/0054146 A1* | 5/2002 | Fukumoto | H04N 21/4312 715/810 |
| 2004/0187023 A1* | 9/2004 | Alagna | G06F 21/56 726/24 |
| 2006/0161889 A1* | 7/2006 | Stabb | G06F 3/0482 717/113 |
| 2006/0218503 A1* | 9/2006 | Matthews | G06F 3/0482 715/779 |
| 2008/0005700 A1* | 1/2008 | Morikawa | G06F 3/0482 715/841 |
| 2009/0247234 A1* | 10/2009 | Kim | G06F 3/0416 455/566 |
| 2010/0062811 A1* | 3/2010 | Park | H04M 1/72586 455/566 |
| 2010/0095217 A1* | 4/2010 | Kang | G06F 16/273 715/738 |
| 2012/0036475 A1* | 2/2012 | Yoshitomi | G06F 3/04883 715/810 |
| 2012/0042036 A1* | 2/2012 | Lau | H04W 4/60 709/217 |
| 2013/0151983 A1* | 6/2013 | Lovitt | G06F 9/451 715/745 |
| 2013/0325856 A1* | 12/2013 | Soto Matamala | G06F 16/29 707/724 |
| 2014/0064709 A1* | 3/2014 | Schmidt | H04N 21/4334 386/297 |
| 2014/0096025 A1* | 4/2014 | Mandel | H04L 67/34 715/739 |
| 2014/0282234 A1* | 9/2014 | Ku | G06F 3/04842 715/800 |
| 2015/0143253 A1* | 5/2015 | Kamiyama | G06F 3/0481 715/745 |
| 2016/0041719 A1* | 2/2016 | Wang | G06F 3/04883 715/769 |
| 2016/0239287 A1* | 8/2016 | Lim | G06F 8/61 |
| 2017/0083350 A1 | 3/2017 | Kamiyama | |
| 2017/0085678 A1* | 3/2017 | Babu | H04L 67/306 |
| 2017/0127214 A1* | 5/2017 | Sohn | G06F 8/654 |
| 2018/0095612 A1* | 4/2018 | Rapp | G06F 3/04817 |
| 2019/0026298 A1* | 1/2019 | Jin | G06F 16/13 |
| 2019/0394149 A1* | 12/2019 | McNeill | H04L 51/046 |

OTHER PUBLICATIONS

Extended European Search Report issued in the corresponding European Patent Application No. 18883397.4, dated Dec. 2, 2020.

* cited by examiner

IMAGE OUTPUT DEVICE, METHOD OF CONTROLLING IMAGE OUTPUT DEVICE, AND TELEVISION

CROSS-REFERENCE OF RELATED APPLICATIONS

This application is the U.S. National Phase under 35 U.S.C. § 371 of International Patent Application No. PCT/JP2018/023206, filed on Jun. 19, 2018, which in turn claims the benefit of Japanese Application No. 2017-230032, filed on Nov. 30, 2017, the entire disclosures of which Applications are incorporated by reference herein.

TECHNICAL FIELD

The present disclosure relates to an image output device that outputs a generated image, and a television including the image output device.

BACKGROUND ART

Patent Literature (PTL) 1 discloses a mobile terminal having an image display. In this mobile terminal, a shortcut item whose selection frequency exceeds a set value is arranged in the next higher level in a menu image in which hierarchized menu items are displayed.

CITATION LIST

Patent Literature

PTL 1: Japanese Patent No. 4051310

SUMMARY OF THE INVENTION

Technical Problems

The present disclosure provides an image output device capable of efficiently performing a process related to a presentation of a menu image showing a set of shortcuts suitable for a user.

Solutions to Problems

An image output device according to the present disclosure is an image output device that outputs a generated image to a display device. The image output device includes: an instruction receiver that receives an instruction from a user; an image generator that generates and outputs a menu image in which at least one of a plurality of shortcuts each associated with a different one of a plurality of application programs is displayed, the menu image being arranged in at least a part of a display area of the display device; an image controller that controls the image generator; a storage that stores application information including information on the plurality of shortcuts; and an updater that updates the application information, in which when the instruction receiver has received a predetermined instruction, the image controller selects, with reference to the application information, from among the plurality of shortcuts, at least one first shortcut satisfying a first criterion and a second shortcut not satisfying the first criterion but satisfying a second criterion, the image generator generates and outputs the menu image in which the at least one first shortcut selected is displayed and the second shortcut selected is displayed in a different form than the at least one first shortcut, and when the instruction receiver has received an OK instruction for the second shortcut included in the menu image, the updater updates the application information to cause the second shortcut to satisfy the first criterion.

Furthermore, an image output device according to the present disclosure is an image output device that outputs a generated image to a display device. The image output device includes: an instruction receiver that receives an instruction from a user; an image generator that generates and outputs a menu image in which at least one of a plurality of shortcuts each associated with a different one of a plurality of application programs is displayed, the menu image being arranged in at least a part of a display area of the display device; an image controller that controls the image generator; a storage that stores application information including information on the plurality of shortcuts; and an updater that updates the application information, in which when the instruction receiver has received a predetermined instruction, the image controller selects, with reference to the application information, from among the plurality of shortcuts, a second shortcut not satisfying a first criterion but satisfying a second criterion, the image generator generates and outputs the menu image in which the second shortcut selected is displayed in a different form than a first shortcut satisfying the first criterion, and when the instruction receiver has received an OK instruction for the second shortcut included in the menu image, the updater updates the application information to cause the second shortcut to satisfy the first criterion.

Advantageous Effects of Invention

The present disclosure provides an image output device capable of efficiently performing a process related to a presentation of a menu image showing a set of shortcuts suitable for a user.

DESCRIPTION OF EXEMPLARY EMBODIMENTS

Figure 1:
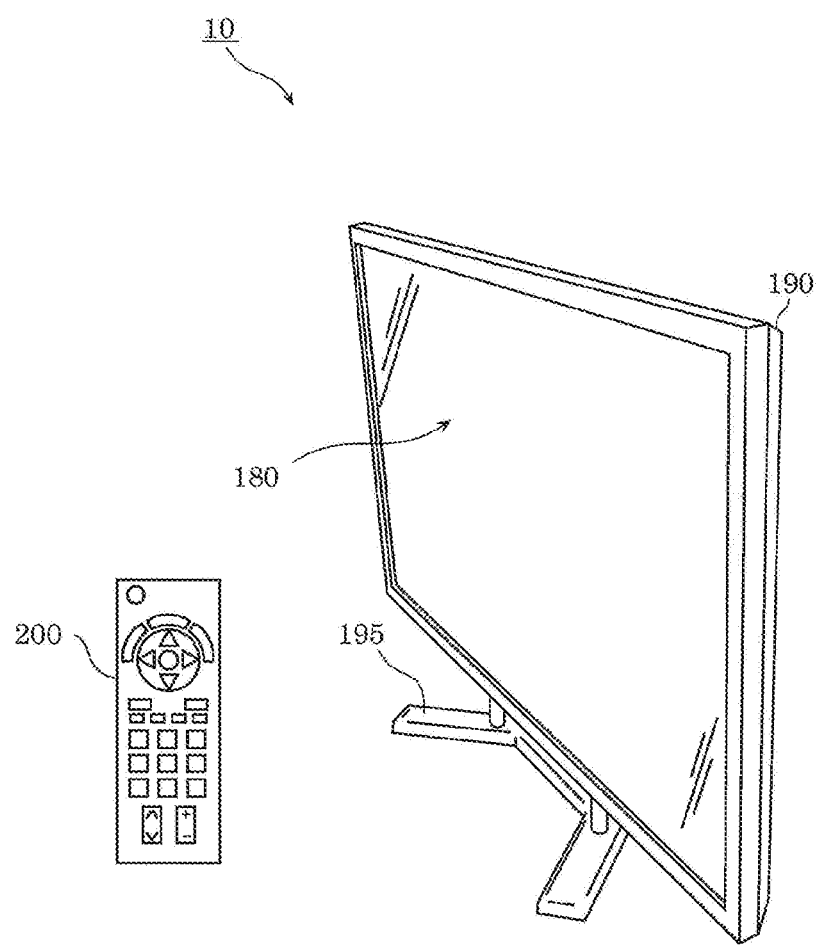
FIG. 1 illustrates the exterior appearances of a television and a remote control according to an embodiment.

The present inventors have found that the following problems arise with respect to a conventional image output device. The conventional image output device included in a television receiver set (hereinafter, referred to as a "television"), a mobile terminal, etc. generates, for example, a menu image with arranged shortcuts for launching application programs available to a user, and the generated menu image is displayed on a display device such as a liquid crystal panel. It should be noted that the "shortcut" refers to an image or a character string, etc. associated with each of the application programs, and is also referred to as an icon, an icon image, or an alias, etc.

As described in the above background art, the menu image is automatically updated based on the frequency of use of each application program by a user. In general, such an updating method is recognized as a method for generating a menu image based on a user's preference without a task of the user.

However, a user may use a specified application program multiple times only for a predetermined period to obtain temporarily necessary information, etc., or launch a specified application multiple times due to mishandling. In other words, the user's true preference may not be matched with the application program whose frequency of use is high, or which has been used a large number of times, etc.

Accordingly, when the menu image is automatically updated based on the frequency of use of the application program by the user, or the number of times that the application program has been used by the user, etc., an undesired shortcut may be forced to be added to the menu image against the user's intention. In this case, the user has to perform an additional operation which is unnecessary under the true condition, such as deleting an unnecessary shortcut from the menu image by manual. In other words, in this case, an unnecessary process under the true condition occurs in the conventional image output device which generates and outputs the menu image.

The present disclosure has been conceived from such knowledge. As a result of the earnest study of the inventors of this application, the configuration of an image output device capable of efficiently performing a process related to a presentation of a menu image showing a set of shortcuts suitable for a user has been conceived.

Hereinafter, an embodiment is specifically described with reference to the drawings. However, the excessively detailed description may be omitted. For example, the detailed description of a well-known matter or the same description for the substantially the same configuration may be omitted. This is to avoid the unnecessary redundancy in the following description and help those skilled in the art to understand this disclosure.

It should be noted that the inventors provide the accompanying drawings and the following descriptions in order to enable those skilled in the art to fully understand this disclosure, and which is not intended to limit the subject matter recited in claims. Furthermore, the respective figures are schematic diagrams, and are not necessarily precise illustrations.

Embodiment (1-1. Configuration)

Figure 2:
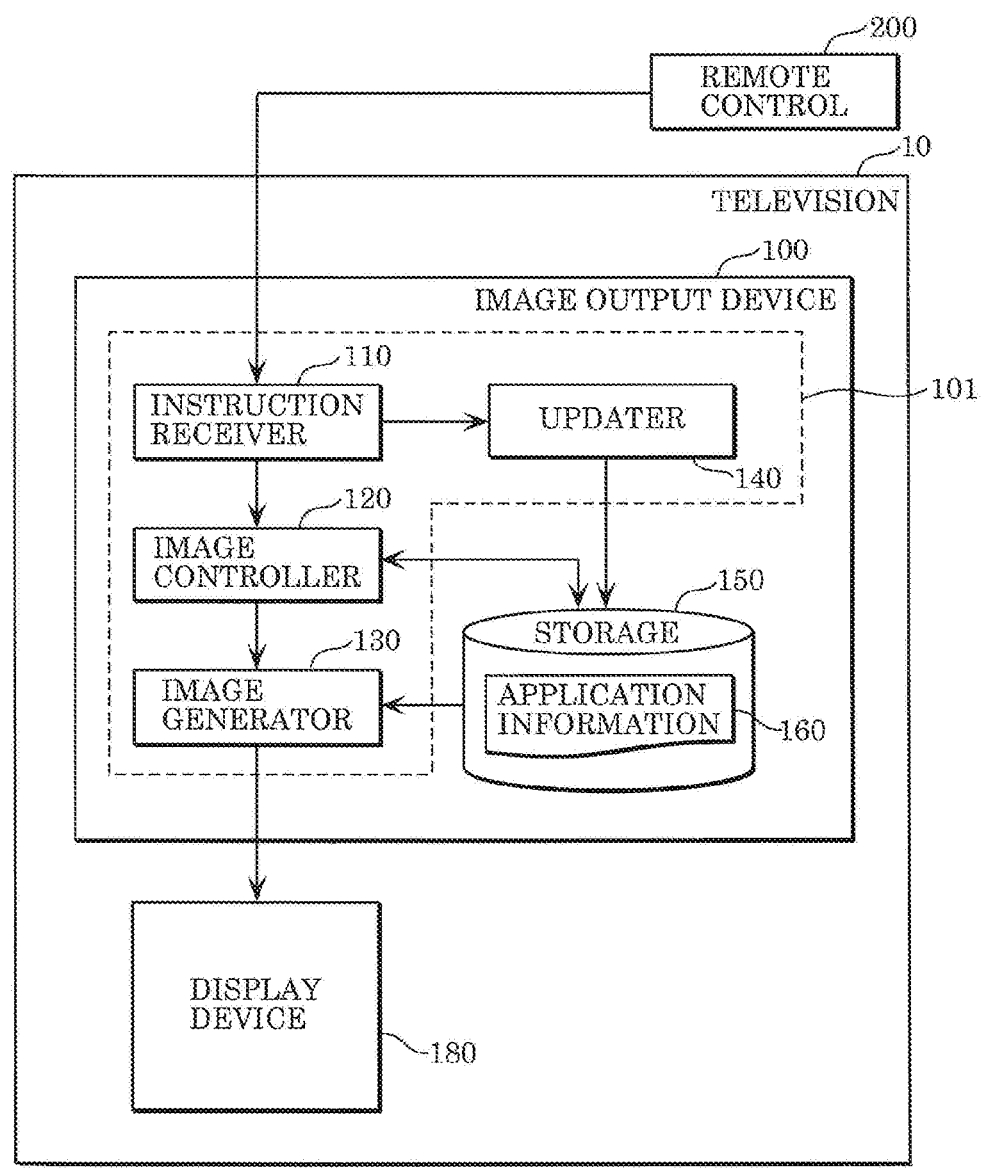
FIG. 2 is a block diagram showing a basic functional configuration of the television according to the embodiment.
Figure 3:
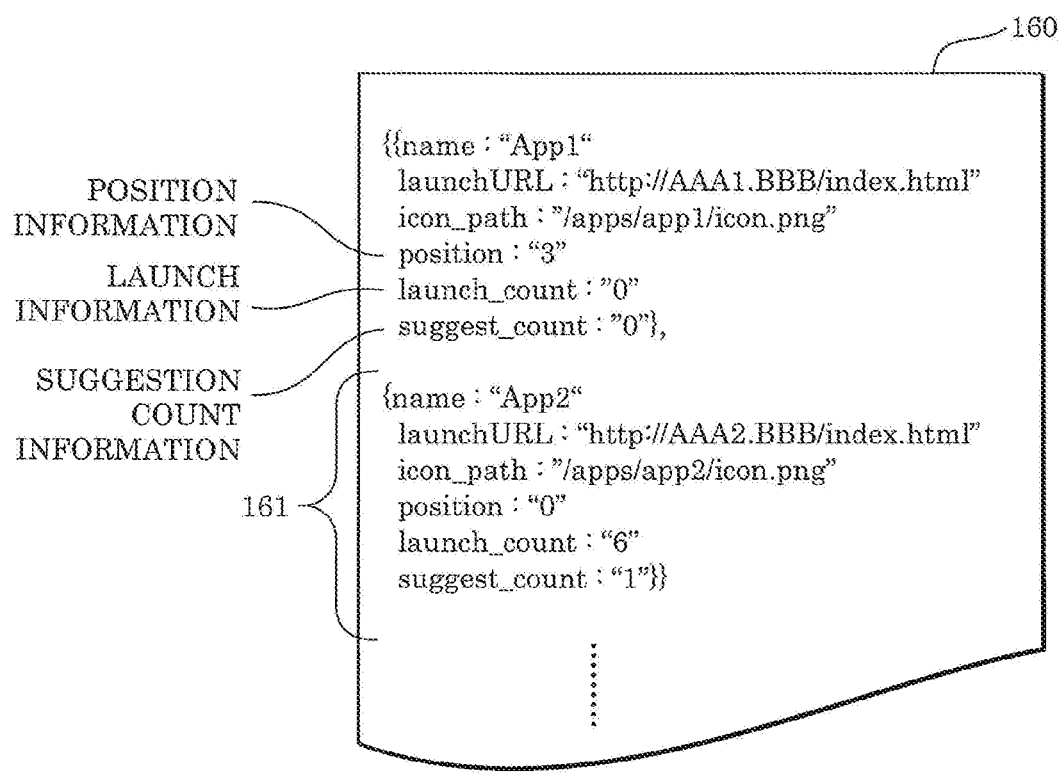
FIG. 3 illustrates an exemplary data structure of application information according to the embodiment.

FIG. 1 illustrates the exterior appearances of television 10 and remote control 200 according to an embodiment. FIG. 2 is a block diagram showing a basic functional configuration of television 10 according to the embodiment. FIG. 3 illustrates an exemplary data structure of application information 160 according to the embodiment.

As shown in FIGS. 1 and 2, television 10 according to the embodiment includes image output device 100 and display device 180. Display device 180 is arranged on a front side of housing 190, and housing 190 houses image output device 100. Stand 195 for supporting housing 190 from the bottom is attached to the bottom of housing 190.

Television 10 can perform an operation such as switching a channel in accordance with a signal from remote control (remote controller) 200 operated by a user. More specifically, remote control 200 has keys, and transmits to television 10 a signal indicating an instruction corresponding to the key pressed by the user, for example, using infrared light. Television 10 has a receiver (not shown) for receiving the signal transmitted using the infrared light, and image output device 100 receives a variety of instructions transmitted from remote control 200 via the receiver.

It should be noted that a communication system between remote control 200 and television 10 is not particularly limited. For example, remote control 200 and television 10 may bidirectionally communicate with each other using wireless communication such as Bluetooth (registered trademark). Furthermore, instead of a dedicated remote control, for example, a general-purpose mobile terminal may be employed as a substitute operating terminal for remote control 200. In this case, the mobile terminal serving as the operating terminal may communicate with television 10 via a wireless local area network (LAN).

Besides the functional blocks shown in FIG. 2, television 10 also includes other components such as a speaker, etc. which should be included as a television receiver set. The illustrations and descriptions of these other components will be omitted to distinctively describe the details of the present disclosure.

Display device 180 has a display panel such as a liquid crystal panel or an organic electroluminescence (EL) panel, and displays the image outputted from image output device 100.

As shown in FIG. 2, image output device 100 includes instruction receiver 110, image controller 120, image generator 130, updater 140, and storage 150. Instruction receiver 110 receives an instruction from a user. Instruction receiver 110 according to this embodiment receives a variety of instructions transmitted from remote control 200.

Image generator 130 generates a home menu in which at least one of shortcuts each associated with a different application program is displayed, and outputs the home menu to display device 180. The home menu outputted to display device 180 is arranged in at least a part of the display area of display device 180. Image controller 120 controls image generator 130. A specific example of the control will be described later with reference to FIGS. 4 and 5 as well as an exemplary appearance of the home menu.

Storage 150 stores application information 160 including information on each of the shortcuts associated with application programs (hereinafter, also referred to as "app(s)"). It should be noted that the apps according to this embodiment can be executed by TV 10. Furthermore, the apps, and data of images materializing the shortcuts may be stored in storage 150, or a storage device inside or outside image output device 100. Updater 140 updates application information 160 stored in storage 150.

It should be noted that storage 150 is implemented as a hard disk drive (HDD) or a semiconductor memory such as a flash memory. Storage 150 may be also implemented as a volatile memory for temporarily storing application information 160 loaded from the storage device outside image output device 100. Furthermore, the functionality of instruction receiver 110, image controller 120, image generator 130, and updater 140 may be implemented by, for example, a processor such as at least one central processing unit (CPU). In other words, the functionality enclosed by the dotted line shown in FIG. 2 may be implemented by at least one processor 101.

As described above, application information 160 according to this embodiment includes information on the shortcuts. More specifically, as shown in FIG. 3, application information 160 is data describing individual information 161 indicating a variety of information on each of the apps. It should be noted that individual information 161 included in application information 160 is also application information on one app.

The items in individual information 161 include the name of an app (name), the address of the app (launchURL), the path to a shortcut, i.e. an icon image, associated with the app (icon_path), the position of the shortcut in the home menu (position), the launch count of the app (launch_count), and the suggestion count of the app (suggest_count). It should be noted that the information indicated by "position" is one example of position information, the information indicated by "launch_count" is one example of launch information, and the information indicated by "suggest_count" is one example of suggestion count information. Furthermore, the total number and types of the items shown in FIG. 3 are one example. The total number and types of the items included in application information 160 are not limited to the total number and types of the items shown in FIG. 3.

(1-2. Basic Operation)

Figure 4:
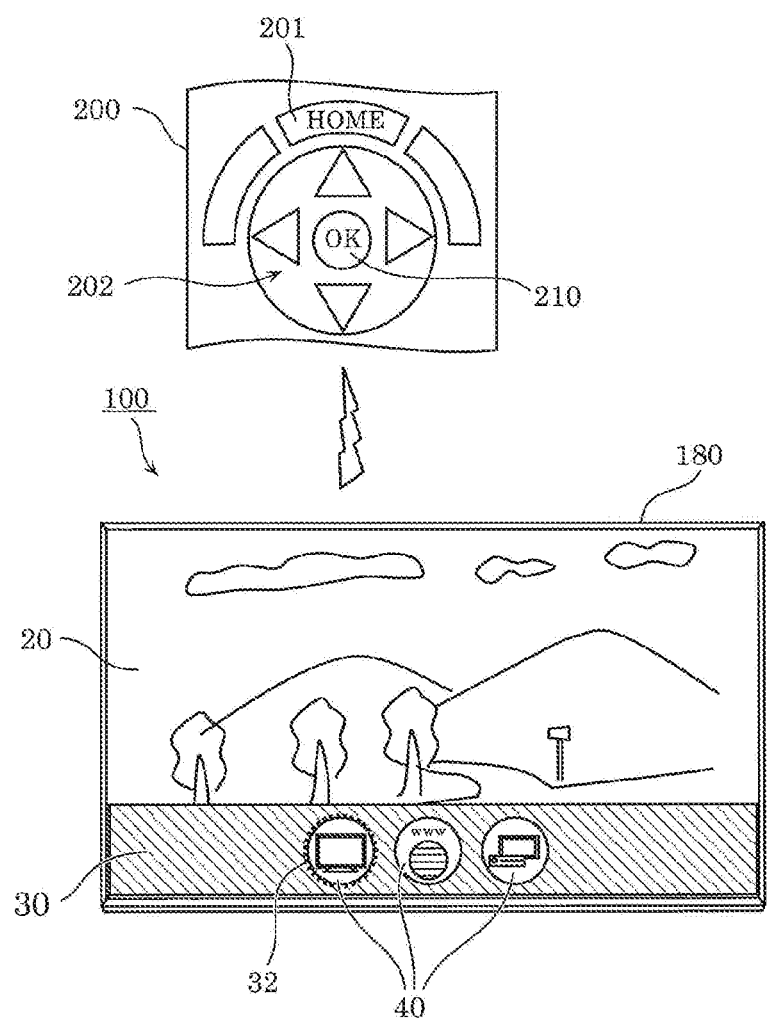
FIG. 4 illustrates an exemplary display screen of the television according to the embodiment.

Next, the operation of television 10 according to this embodiment, particularly the processing of image output device 100, will be described with reference to FIG. 4. FIG. 4 illustrates an exemplary display screen of television 10 according to the embodiment.

As shown in FIG. 4, when home button 201 of remote control 200 is pressed while a broadcast TV program (broadcast image 20) is being displayed on display device 180, television 10 according to this embodiment superimposes home menu 30 on broadcast image 20.

In home menu 30, for example, at least one predetermined shortcut 40 is displayed in the default setting, and a user can change the types and display order of shortcuts 40 arranged in home menu 30 by operating remote control 200. In this embodiment, shortcuts 40 to be displayed in home menu 30 are in one-to-one correspondence with the apps.

Furthermore, television 10 according to this embodiment has a function that suggests, to a user, shortcut 40 to be arranged in home menu 30. This suggestion function will be described later with reference to FIG. 5, etc. Firstly, the basic points about home menu 30 will be described with reference to FIG. 4.

In an example shown in FIG. 4, three shortcuts 40 are arranged in home menu 30, and focus 32 is applied to leftmost shortcut 40 at a time when home menu 30 starts to be displayed. In this situation, a user can move focus 32 from side to side by operating cross key 202 of remote control 200. With this, shortcut 40 with focus 32 (the dotted line circle in FIG. 4), i.e. shortcut 40 selected by the user, switches. The user can launch the app associated with the selected shortcut 40 (hereinafter, also referred to as "the app of shortcut 40") by pressing OK button 210.

It should be noted that three shortcuts 40 shown in FIG. 3 are respectively associated with an app for viewing a TV program (a television app), a web browser, and an app for selecting and operating an external device connected to TV 10 (an external device list app) from left to right.

The user can display home menu 30 on display device 180 by pressing home button 201 of remote control 200 even when viewing a TV program or running any app. With this, the user can immediately launch the app associated with shortcut 40 included in home menu 30. Furthermore, for example, it is possible to display home menu 30 on display device 180 as a welcome screen of when television 10 is turned on. Furthermore, when home button 201 of remote control 200 is pressed while home menu 30 is being displayed, home menu 30 disappears and the display screen of display device 180 returns to, for example, the previous state which was before home menu 30 appears.

(1-3. Exemplary Transition of Home Menu)

The image output device that generates home menu 30 has the suggestion function about shortcut 40 as described above. The outline of this suggestion function will be described with reference to the transition of appearance of home menu 30.

Figure 5:
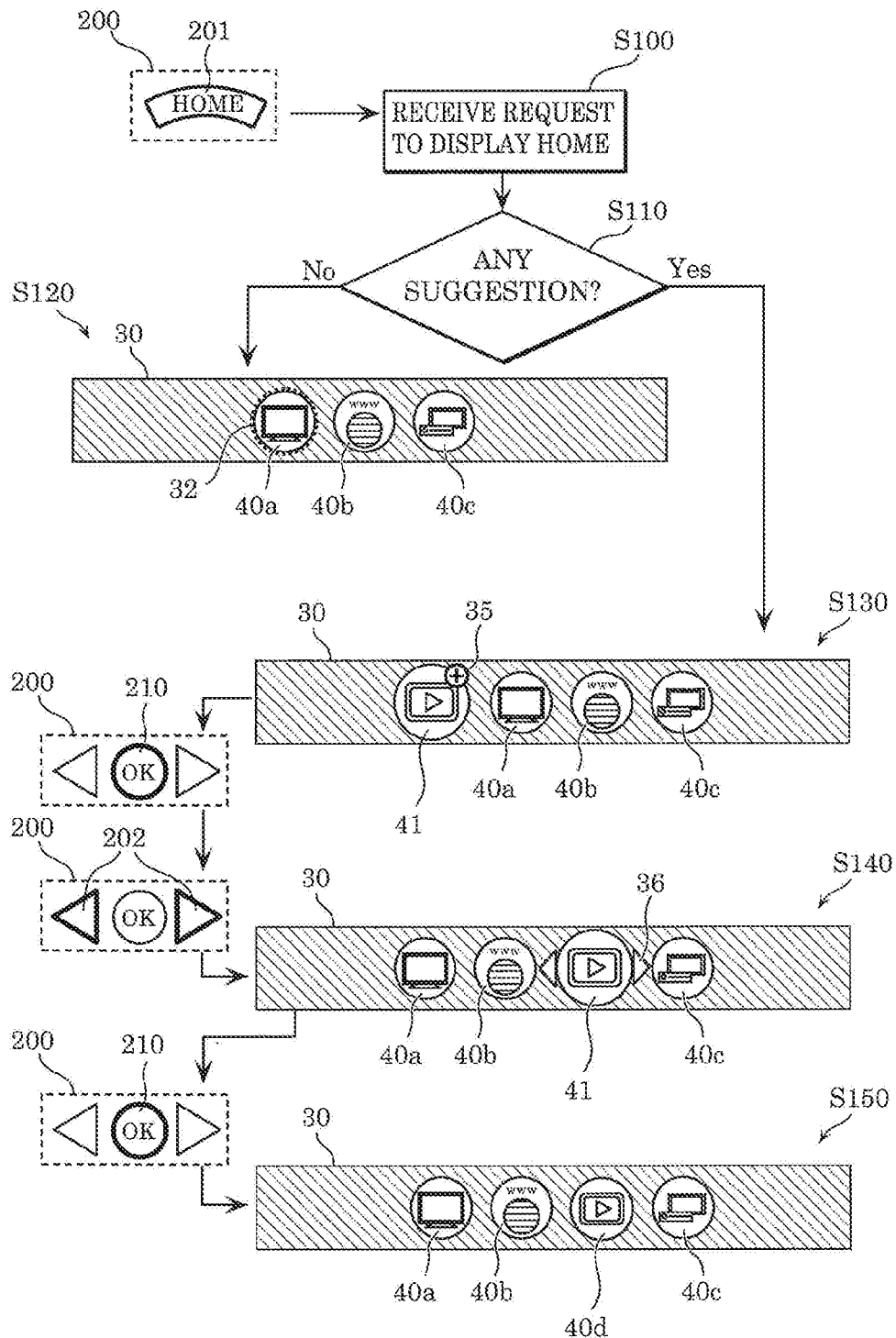
FIG. 5 illustrates an exemplary transition of a home menu of the television according to the embodiment.

FIG. 5 illustrates an exemplary transition of home menu 30 of television 10 according to the embodiment. It should be noted that in FIG. 5, reference numerals 40a through 40d are provided to the respective shortcuts to distinguish among shortcuts 40.

As shown in FIG. 5, when home button 201 of remote control 200 is pressed, image output device 100 in television 10 according to this embodiment receives a signal (a home request signal) indicating an instruction to display home menu 30, transmitted from remote control 200 (S100).

Image output device 100 determines based on application information 160 whether shortcut 40 suggested to be added to home menu 30 is present or not (S110). As a result of this determination, when no suggested shortcut 40 is present (No at S110), image output device 100 outputs home menu 30 including at least one shortcut 40 identified based on application information 160 as of then. Accordingly, as shown in FIG. 5, home menu 30 with arranged shortcuts 40a through 40c is displayed on display device 180 (S120).

On the other hand, as a result of the above determination (S110), when suggested shortcut 40 is present (Yes at S110), image output device 100 outputs home menu 30 including suggested shortcut 40 (suggested shortcut 41). Accordingly, as shown in FIG. 5, home menu 30 with not only shortcuts 40a through 40c but also suggested shortcut 41 arranged in a predetermined position is displayed on display device 180 (S130). More specifically, suggested shortcut 41 is displayed at the first place in the shortcut sequence, in a different form than other shortcuts 40a through 40c.

Suggested shortcut 41 according to this embodiment is displayed larger than other shortcuts 40a through 40c, and has suggestion mark 35 (in FIG. 5, "+" surrounded by a circle). More specifically, normal shortcut 40 (in this example, shortcut 40d), on which suggested shortcut 41 is based, is enlarged, and suggestion mark 35 is added to the upper right of shortcut 40d. In other words, suggested shortcut 41 is formed by displaying shortcut 40d in a different format than other shortcuts 40a through 40c. Accordingly, for example, adding suggested shortcut 41 to home menu 30 substantially means adding shortcut 40d to home menu 30.

It should be noted that shortcuts 40a through 40c are each one example of the first shortcut, and shortcut 40d corresponding to suggested shortcut 41 is one example of the second shortcut.

Suggested shortcut 41 displayed at S130 does not have a function for launching the app. After the following user operation, suggested shortcut 41 is displayed in home menu 30 as shortcut 40d capable of launching the app.

More specifically, suggested shortcut 41 with suggestion mark 35 is in a selected state at the start of display. When OK button 210 of remote control 200 is pressed in this state, suggested shortcut 41 transitions to a state in which the arrangement position can be shifted (S140). Even when focus 32 is applied to another shortcut at the start of display, suggested shortcut 41 can also transition to the state in which the arrangement position can be shifted (S140) by pressing OK button 210 after the focus is moved to suggested shortcut 41 using the right and left buttons of remote control 200.

In the example shown in FIG. 5, arrow mark 36 indicating that suggested shortcut 41 is movable is displayed on the right and left of suggested shortcut 41. In this state, a user can shift suggested shortcut 41 to a desired position by operating cross key 202 of remote control 200. Next, when OK button 210 of remote control 200 is pressed in the state in which suggested shortcut 41 is displayed along with arrow mark 36, the position of suggested shortcut 41 as of then is determined as the arrangement position of suggested shortcut 41, and suggested shortcut 41 is displayed in home menu 30 as normal shortcut 40, i.e. shortcut 40*d* in FIG. 5, (S150). In other words, suggested shortcut 41 is determined to be added to home menu 30, and thereby shortcut 40*d* corresponding to suggested shortcut 41 is displayed in home menu 30 in a normal form.

With this, a user can launch the app of shortcut 40*d* by selecting shortcut 40*d*. After this, for example, when viewing a TV program, a user can call up home menu 30 by pressing home button 201 of remote control 200, and immediately launch the app of any one of shortcuts 40*a* through 40*d* displayed in home menu 30.

It should be noted that when not desiring to add suggested shortcut 41 to home menu 30, a user press, for example, the right button of cross key 202 of remote control 200 while suggested shortcut 41 is being initially displayed (S130 in FIG. 5). With this, focus 32 is applied to shortcut 40*a* which is the top of shortcuts 40*a* through 40*c* (the leftmost shortcut), and suggested shortcut 41 disappears from home menu 30. In other words, home menu 30 returns to the previous state (S120) which is before suggested shortcut 41 is displayed.

Furthermore, for example, when home button 201 of remote control 200 is pressed before suggested shortcut 41 is determined to be added to home menu 30, home menu 30 disappears and suggested shortcut 41 is not added to home menu 30. A method for preventing suggested shortcut 41 from being added to home menu 30 is not limited to this. For example, it is possible that when home menu 30 with suggested shortcut 41 (S130 in FIG. 5) is hidden, suggested shortcut 41 is not displayed next time home menu 30 is displayed.

(1-4. Processing Flow of Image Output Device)

Next, the above transition of appearance of home menu 30 will be described in terms of the processing flow of image output device 100 that generates and outputs home menu 30.

Figure 6:
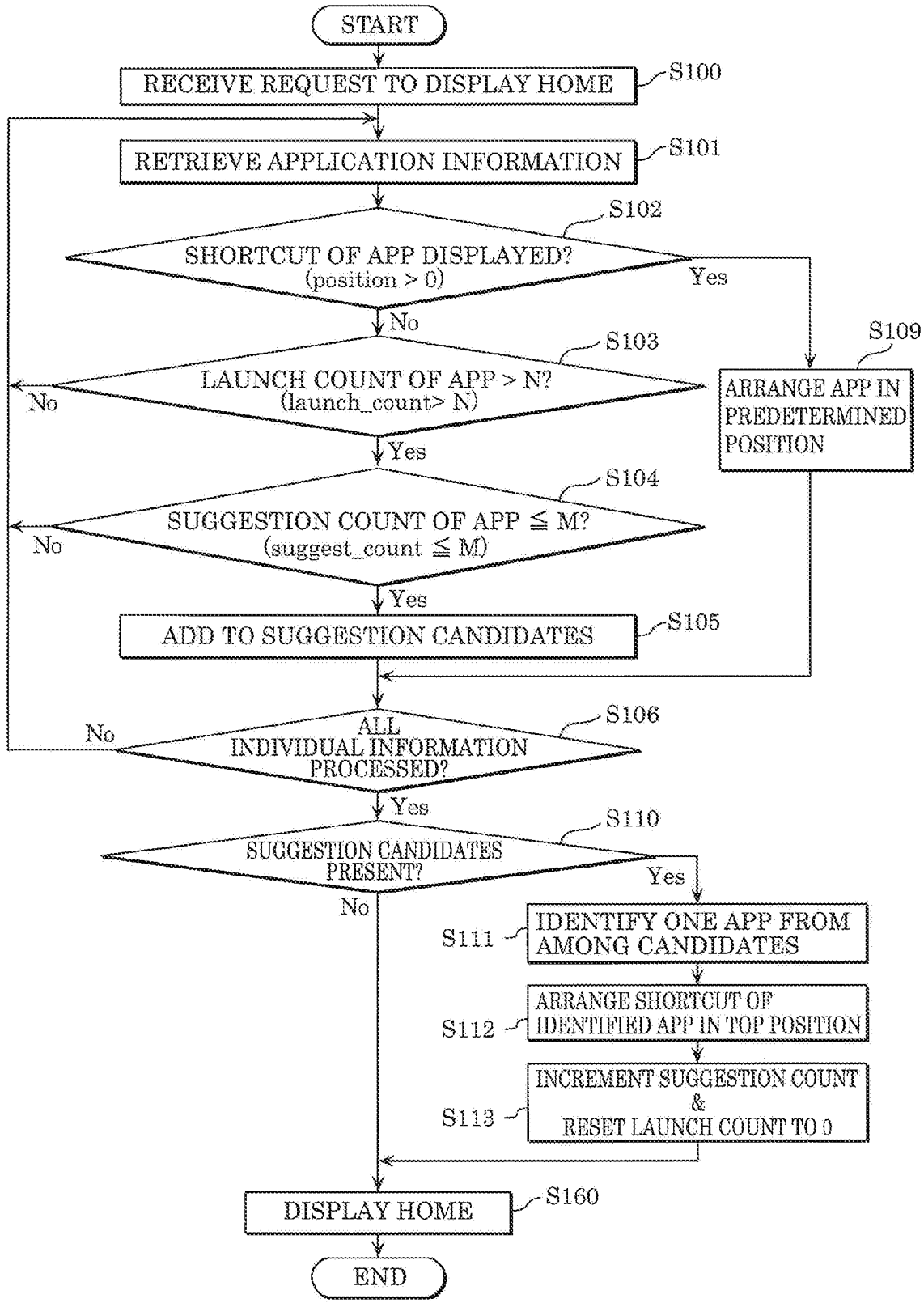
FIG. 6 is the first flow chart showing an exemplary processing flow of an image output device according to the embodiment.
Figure 7:
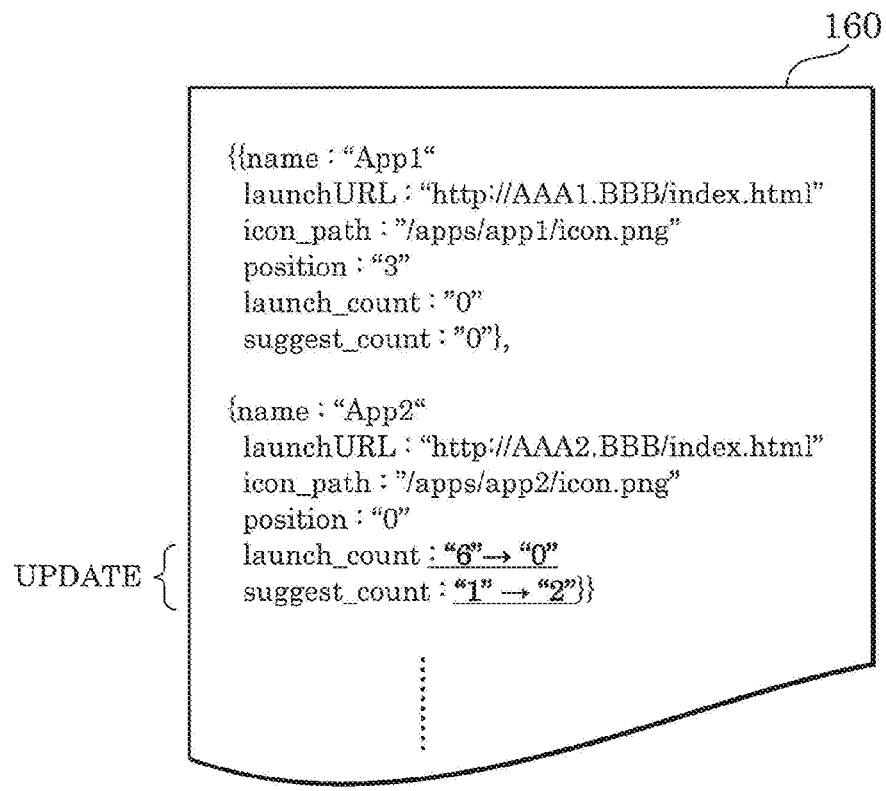
FIG. 7 is the first view showing an exemplary format of updating the application information according to the embodiment.
Figure 8:
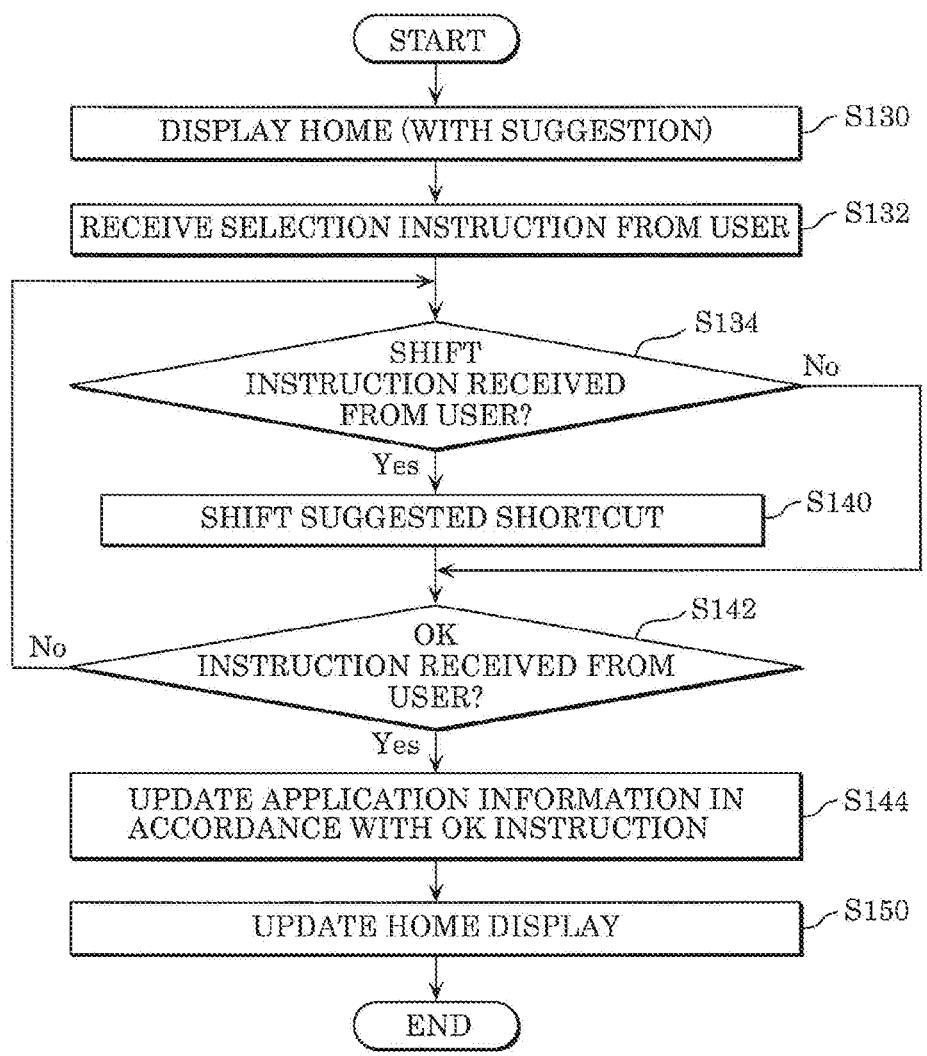
FIG. 8 is the second flow chart showing an exemplary processing flow of the image output device according to the embodiment.
Figure 9:
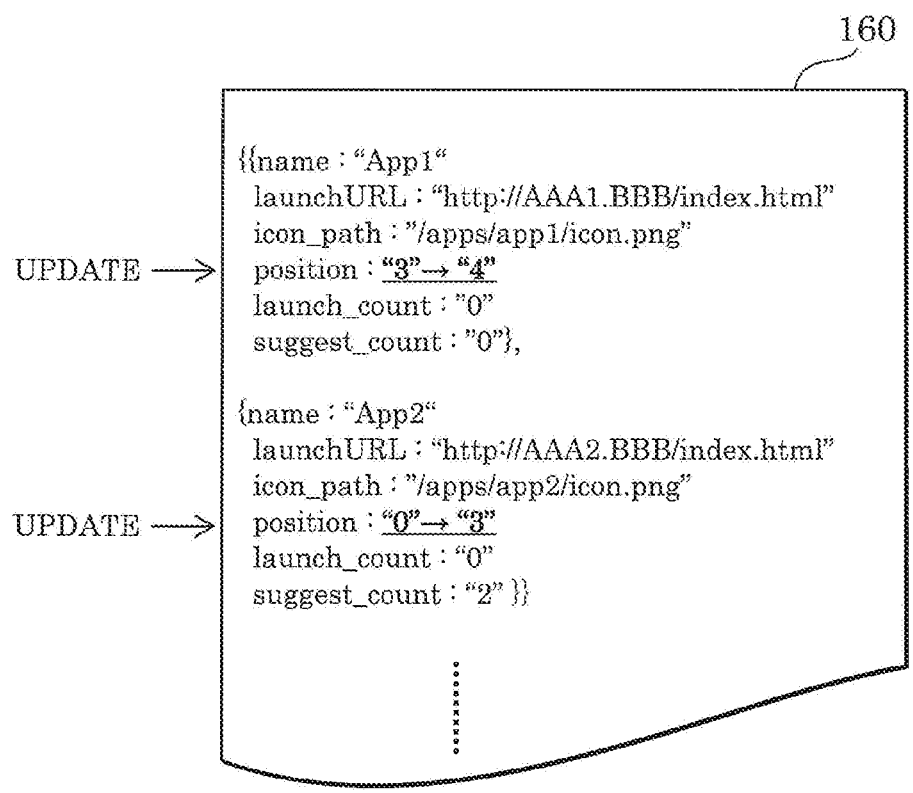
FIG. 9 is the second view showing an exemplary format of updating the application information according to the embodiment.

FIG. 6 is the first flow chart showing an exemplary processing flow of image output device 100 according to the embodiment. FIG. 7 is the first view showing an exemplary format of updating application information 160 according to the embodiment. FIG. 8 is the second flow chart showing an exemplary processing flow of image output device 100 according to the embodiment. FIG. 9 is the second view showing an exemplary format of updating application information 160 according to the embodiment.

Instruction receiver 110, image controller 120, image generator 130, and updater 140 included in image output device 100 each performs, for example, a variety of steps shown in FIGS. 6 and 8 to generate and update home menu 30.

More specifically, instruction receiver 110 receives an instruction to display home menu 30, transmitted from remote control 200 (S100). The instruction to display home menu 30 is one example of a predetermined instruction.

Image controller 120 retrieves application information 160 from storage 150 (S101). Image controller 120 identifies at least one shortcut 40 to be displayed in home menu 30 with reference to application information 160. More specifically, application information 160 includes information on each of the apps (individual information 161), and image controller 120 sequentially refers to each individual information to determine whether shortcut 40 corresponding to each individual information is displayed in home menu 30 or not.

In other words, image controller 120 determines whether shortcut 40 of a target app is to be displayed in home menu 30 (S102). More specifically, when the arrangement position indicated by the position information (position) included in the individual information is greater than "0", shortcut 40 of the app is determined to be displayed (Yes at S102), whereas when the value indicated by "position" is equal to "0", shortcut 40 of the app is determined not to be displayed (No at S102). In other words, in this embodiment, the position information of shortcut 40 included in application information 160 is used to determine whether its shortcut 40 is to be displayed in home menu 30 or not.

For example, in application information 160 shown in FIG. 3, the position information of App1 is "3", and thus shortcut 40 of App1 is determined to be displayed. In this case, as the result of this determination, image generator 130 retrieves the path to shortcut 40 (icon_path) of App1. Image generator 130 arranges shortcut 40 of App1 at the third place in the predetermined arrangement positions (the arrangement order) of shortcuts 40 in home menu 30 (S109). It should be noted that at this time, home menu 30 is not outputted to display device 180. Image generator 130 generates picture data of home menu 30 in which shortcut 40 of App1 is arranged at the third place in the arrangement order of shortcuts 40, and stores the picture data in the predetermined storage area. Subsequently, image controller 120 determines whether all individual information 161 has been processed or not (S106).

In the case of this example, all individual information 161 has not been processed (No at S106), and thus image controller 120 retrieves application information 160, i.e. more specifically, individual information on App2 (S101). The value indicated by the position information (position) included in the individual information on App2 is "0", and thus image controller 120 determines that shortcut 40 of App2 is not to be displayed (No at S102).

Next, image controller 120 determines whether the value indicated by the launch information (launch_count) of App2 is greater than N or not (S103). It should be noted that the launch information (launch_count) according to this embodiment is information indicating a launch_count. N is a threshold of "4". Accordingly, in this example, "launch_count=6" is indicated (Yes at S103), and thus the processing of image controller 120 proceeds to the next determination.

More specifically, image controller 120 determines whether the value indicated by the suggestion count information (suggest_count) of App2 is less than or equal to the maximum suggestion count M or not (S104). It should be noted that in this embodiment, the maximum suggestion count M is, for example, "2", and "suggest_conunt=1" is indicated. In other words, the suggestion count of App2 is less than or equal to the maximum suggestion count M of 2 (Yes at S103), and thus image controller 120 adds shortcut 40 of App2 to suggestion candidates (S105). For example, information for identifying shortcut 40 of App2 (the name of app, the path to shortcut 40 of App2, etc.) is stored as a suggestion candidate in a temporary storage area included in image controller 120. Furthermore, a part of storage 150 may be used as the storage area for the suggestion candidates.

As described above, shortcut 40 suggested to be added to home menu 30 is selected with reference to the number of times that shortcut 40 has been suggested, and thus shortcut 40 which has been already selected as a suggestion candidate three times is excluded from the suggestion candidates.

Subsequently, image controller 120 repeats the above steps (S101 through S105, and S109) until all individual information 161 has been processed (Yes at S106).

Furthermore, when all individual information 161 has been processed (Yes at S106) and no suggestion candidate is present (No at S110), image controller 120 controls image generator 130 to generate and output home menu 30 without suggested shortcut 41. Display device 180 displays home menu 30 outputted from image generator 130. In this case, for example, home menu 30 at S120 in FIG. 5 is displayed. In this home menu 30, three shortcuts 40a through 40c are displayed, and this means that the position information (position) on each of the three apps associated with shortcuts 40a through 40c, in application information 160 is greater than "0".

Here, in the process using application information 160 shown in FIG. 3, as described above, shortcut 40 of App2 is selected as a suggestion candidate (S105). Thus, in this case, at least one suggestion candidate is present (Yes at S110). Accordingly, image controller 120 identifies one app as an app suggested to be added to home menu 30 from among at least one suggestion candidate (S111). In other words, when the suggestion candidate is App2 only, image controller 120 identifies App2.

Furthermore, when multiple apps are suggestion candidates, image controller 120 identifies an app with the highest launch_count with reference to the launch information (launch_count) on each of the apps in application information 160 (S111). It should be noted that the condition of "the highest launch_count" used in this identifying is one example of the third criterion. Hereinafter, for ease of explanation, the processing of image output device 100 will be described where image controller 120 identifies App2 as an app suggested to be added to home menu 30.

Image generator 130 retrieves the path to shortcut 40 (icon_path) of the identified App2. Image generator 130 arranges shortcut 40 of App2 at the top (the zero-th position) of the arrangement order of home menu 30 as suggested shortcut 41 (see FIG. 5) (S112).

Furthermore, updater 140 reflects the result of the above identification of the suggested app in application information 160 by updating application information 160 (S113). More specifically, as shown in FIG. 7, the launch information (launch_count) of App2 is reset to "0". Furthermore, the suggestion count information (suggest_count) of App2 is incremented. In other words, the suggestion count information (suggest_count) is changed from "1" to "2".

It should be noted that in determining process S102, the condition that the arrangement position is within the predetermined range (in this embodiment, an integer greater than "0") is one example of the first criterion. The condition that the value indicated by the suggestion count information (suggest_count) is less than or equal to the maximum suggestion count M (in this embodiment, "2") is one example of the second criterion. In other words, shortcut 40 of App1 with the position information (position) of "3" is one example of the first shortcut satisfying the first criterion. Furthermore, shortcut 40 of App2 with the suggestion count information (suggest_count) of "1" is one example of the second shortcut satisfying the second criterion.

With this processing, home menu 30 superimposed on the normal screen such as a TV program is displayed on display device 180 of television 10 (S160). In this case, home menu 30 with suggested shortcut 41 is displayed, for example, like home menu 30 at S130 in FIG. 5.

More specifically, shortcut 40d of App2 identified as the app suggested to be added to home menu 30 is displayed in home menu 30 as suggested shortcut 41 by image controller 120. In other words, suggested shortcut 41 obtained by adding suggestion mark 35 to shortcut 40d, etc. is displayed at the top (the left side) of shortcuts 40a through 40c already added to home menu 30.

When home menu 30 with suggested shortcut 41 is displayed in this manner, as described above with reference to FIG. 5, a user can determine by him/herself whether suggested shortcut 41 is to be added to home menu 30 or not and where the position of suggested shortcut 41 is if added. In this case, image output device 100 performs, for example, the steps shown in FIG. 8 in accordance with the user's operation of remote control 200.

More specifically, first, home menu 30 with suggested shortcut 41 outputted from image generator 130 is displayed on display device 180 (S130). When desiring to add suggested shortcut 41 to home menu 30 in the situation where home menu 30 is displayed, a user presses OK button 210 of remote control 200. With this, a signal (a selection signal) indicating a selection instruction for suggested shortcut 41 is transmitted from remote control 200, and is received by instruction receiver 110. In other words, instruction receiver 110 receives the selection instruction for suggested shortcut 41 from the user (S132).

At this time, suggested shortcut 41 is positioned at the top of the sequence of shortcuts 40. In this state, when desiring to change the position of suggested shortcut 41, the user operates cross key 202 of remote control 200. With this, instruction receiver 110 receives a shift instruction for suggested shortcut 41 (S134). In this case, image controller 120 controls image generator 130 to change the position of suggested shortcut 41 to the position corresponding to the shift instruction. With this, for example, suggested shortcut 41 is shifted to the third place in the sequence of shortcuts 40 (S140). In other words, as shown in home menu 30 at S140 in FIG. 5, shortcut 40a, shortcut 40b, suggested shortcut 41, and shortcut 40c are arranged in this order from left to right.

Subsequently, when the user presses OK button 210 of remote control 200, a signal indicating an OK instruction (an OK signal) is transmitted from remote control 200 and received by instruction receiver 110. In other words, instruction receiver 110 receives the OK instruction for suggested shortcut 41 from the user (Yes at S142). With this, the position of suggested shortcut 41 is fixed. More specifically, image controller 120 controls image generator 130 to generate home menu 30 in which normal shortcut 40 (shortcut 40d in FIG. 5) corresponding to suggested shortcut 41 is arranged at the position of suggested shortcut 41 as of then, i.e. in this example, the third place.

Furthermore, updater 140 reflects the above addition of suggested shortcut 41 to home menu 30 in application information 160 by updating application information 160 (S144). More specifically, as shown in FIG. 9, the position information (position) of App2 is changed from "0" to "3". In other words, application information 160 is updated to cause shortcut 40d to satisfy the first criterion.

Furthermore, for example, App1 is an app of shortcut 40c positioned at the third place before the update of home menu 30, and thus the position information (position) of App1 is changed from "3" to "4".

With this processing, updated home menu 30 superimposed on the normal screen such as a TV program is displayed on display device 180 of television 10 (S150). In other words, shortcut 40d is added, in accordance with the OK instruction from a user, to home menu 30 in which three shortcuts 40 (40a through 40c) have been displayed before the update. Furthermore, shortcut 40d is arranged at the position determined by the user's operation of remote control 200 (the third place in the sequence of shortcuts 40), and shortcut 40c which has been positioned at the third place in home menu 30 before the update is shifted to the fourth place.

(1-5. Effects, Etc.)

As described above, image output device 100 according to this embodiment is image output device 100 that outputs a generated image to display device 180. The image output device includes: instruction receiver 110 that receives an instruction from a user; image generator 130 that generates and outputs home menu 30; image controller 120 that controls image generator 130; storage 150 that stores application information 160; and updater 140 that updates the application information. Home menu 30 is one example of a menu image arranged in at least a part of a display area of display device 180. Home menu 30 displays at least one of shortcuts 40 each associated with a different one of application programs. Application information 160 includes information on shortcuts 40.

When instruction receiver 110 has received a display instruction for home menu 30, image controller 120 selects, with reference to application information 160, from among shortcuts 40, at least one shortcut 40 (first shortcut) satisfying a first criterion and shortcut 40 (second shortcut) not satisfying the first criterion but satisfying a second criterion.

Image generator 130 generates and outputs home menu 30 in which the at least one first shortcut selected is displayed and the second shortcut selected is displayed in a different form than the at least one first shortcut (see home menu 30 at S130 in FIG. 5).

When instruction receiver 110 has received an OK instruction for the second shortcut included in home menu 30, updater 140 updates application information 160 to cause the second shortcut to satisfy the first criterion.

With this configuration, at least one shortcut 40 already set to be displayed in home menu 30 (satisfying the first criterion) and shortcut 40 suggested to be added to home menu 30 (satisfying the second criterion) are displayed in home menu 30 in a form different from each other. In this embodiment, as shown in FIG. 5, shortcut 40 suggested to be added to home menu 30 is displayed in home menu 30 as suggested shortcut 41 obtained by modification such as addition of suggestion mark 35.

Furthermore, when instruction receiver 110 has received an OK instruction for suggested shortcut 41, application information 160 is updated to cause suggested shortcut 41 to satisfy the first criterion.

In other words, image output device 100 according to this embodiment does not automatically add shortcut 40 to home menu 30 even when shortcut 40 is satisfying the second criterion such as a condition that the launch_count of the corresponding app is higher than or equal to the threshold.

More specifically, shortcut 40 satisfying the second criterion is temporarily displayed as suggested shortcut 41, and suggested shortcut 41 is added to home menu 30 in accordance with the OK instruction for suggested shortcut 41 from a user. In other words, in actual processing, application information 160 is updated to cause normal shortcut 40 corresponding to suggested shortcut 41 to be displayed in home menu 30.

This prevents shortcut 40 from being forced to be added to home menu 30 against user's will or despite the intention of a user. Accordingly, a user need not perform an additional operation which is unnecessary under the true condition, such as deleting shortcut 40 forced to be added to home menu 30 by manual. In other words, an unnecessary process under the true condition, which associates with this additional operation, does not occur in image output device 100 that generates and outputs home menu 30. Thus, image output device 100 according to this embodiment efficiently performs the process of presenting a menu image (home menu 30) showing a set of shortcuts suitable for a user.

It should be noted that the menu image may display not the first shortcut but the second shortcut. For example, when shortcut 40 satisfying the first criterion is not present and shortcut 40 satisfying the second criterion is present, image controller 120 selects shortcut 40 satisfying the second criterion as the second shortcut. In this case, image generator 130 displays the selected second shortcut in home menu 30 in a different form than the first shortcut. In other words, shortcut 40 selected as the second shortcut is displayed in home menu 30 as suggested shortcut 41. Even in this case, shortcut 40 displayed as suggested shortcut 41 can be determined whether to be added to home menu 30 or not in accordance with the intention of a user.

Furthermore, in this embodiment, application information 160 includes, for each of shortcuts 40, position information (position) indicating an arrangement position in home menu 30. Image controller 120 selects, with reference to the position information, as at least one first shortcut, at least one shortcut 40 satisfying a condition that the arrangement position is within a predetermined range, the condition being the first criterion. Image generator 130 generates and outputs home menu 30 in which each of the at least one first shortcut is arranged in the arrangement position indicated by the position information and the second shortcut is arranged in a predetermined position.

When instruction receiver 110 has received a shift instruction for the second shortcut, image controller 120 further controls image generator 130 to display the second shortcut in a position corresponding to the shift instruction in home menu 30. When instruction receiver 110 has received the OK instruction after receiving the shift instruction, updater 140 updates application information 160 by updating the position information to arrange the at least one first shortcut and the second shortcut in their respective positions corresponding to the shift instruction within the predetermined range.

With this configuration, the second shortcut suggested to be added to home menu 30 is determined (fixed) to be added to home menu 30 after a user selects the arrangement position in home menu 30 by him/herself. In this embodiment, as shown in FIGS. 5 and 8, a user can change the position of suggested shortcut 41 by operating cross key 202 of remote control 200. Furthermore, the user presses OK button 210 of remote control 200 while suggested shortcut 41 is arranged at a position desired by the user, and thereby suggested shortcut 41 is determined (fixed) to be added to home menu 30. In other words, shortcut 40d (second shortcut) represented as suggested shortcut 41 is added to home menu 30. Thus, in this embodiment, the arrangement position of shortcut 40 newly added to home menu 30 can be determined by a user at the adding. Accordingly, for example, the adding of new shortcut 40 to home menu 30 is more efficiently performed in accordance with the intension of a user.

Furthermore, in this embodiment, application information 160 includes, for each of shortcuts 40, suggestion count information (suggest_count) indicating a suggestion count which is a total number of times that each shortcut has been selected as the second shortcut by image controller 120.

Image controller 120 determines, with reference to the suggestion count information, that a shortcut satisfying a condition that the suggestion count is less than or equal to M (in this embodiment, M=2) satisfies the second criterion. Updater 140 further updates the suggestion count information to increment the suggestion count associated with the second shortcut selected by image controller 120.

With this configuration, for example, shortcut 40 which has been suggested to be added to home menu 30 three times is excluded from suggestion candidates. Accordingly, for example, with respect to any one shortcut 40, the possibility of needlessly suggesting a user to add it to home menu 30 is reduced. In other words, with respect to an app launched relatively many times but unnecessary to be called up by a user from home menu 30, the possibility of displaying its shortcut 40 many times as suggested shortcut 41 is reduced.

Furthermore, in this embodiment, application information 160 includes launch information (launch_count) indicating a launch_count which is a total number of times that each of the plurality of application programs has been launched. Image controller 120 determines, with reference to the launch information, that shortcut 40 associated with an application program having the launch_count higher than N (in this embodiment, N=4), and satisfying the condition that the suggestion count is less than or equal to M (in this embodiment, M=2) satisfies the second criterion. Updater 140 further updates the launch information to clear the launch_count of an application program associated with the second shortcut selected by image controller 120.

In this embodiment, shortcut 40 associated with an app having the launch count greater than 4 and the suggestion count less than or equal to the maximum suggestion count M of 2 is determined to satisfy the second criterion, and treated as a suggestion candidate. In other words, the selection of shortcut 40 to be suggested to a user to be added to home menu 30 is more accurately performed. Furthermore, when its shortcut 40 is selected as shortcut 40 to be displayed in home menu 30 as suggested shortcut 41 (i.e. the second shortcut), the launch_count is cleared to zero.

Here, for example, it is assumed that shortcut 40 displayed in home menu 30 as suggested shortcut 41 is deleted from home menu 30 after being added to home menu 30. In this case, the launch_count of the app associated with its shortcut 40 is cleared to zero at the adding to home menu 30. Accordingly, it is precisely determined based on the latest status of this app (the launch_count) whether its shortcut 40 is regarded again as a suggestion candidate or not.

Furthermore, in this embodiment, application information 160 includes launch information (launch_count) on a launch_count which is a time when each of application programs has been launched. When there are suggestion candidates which are each shortcut 40 satisfying the second criterion, image controller 120 further identifies, with reference to the launch information, from among some of the application programs associated with the suggestion candidates, one application program having the launch_count satisfying a third criterion. Image controller 120 also selects, as the second shortcut, shortcut 40 associated with the one application program identified With this configuration, for example, when multiple apps are satisfying the second criterion based on the launch_count, etc., it is possible to identify one app suggested to a user from among the apps, based on the usage history of a user. Accordingly, for example, when television 10 can execute relatively many apps, it is possible to efficiently refine the shortcuts suggested to be added to home menu 30.

It should be noted that in this embodiment, the third criterion is "the launch count is the highest", but is not limited to this. For example, a condition based on a launch time may be employed as the third criterion. In this case, the launch information in application information 160 may include, for example, information on a time when each of the apps has been launched. The information on a time when the app has been launched includes, for example, any one of the date and time when the app has been launched first, the duration between the time when the app has been launched first and the time when the app has been launched most recently, and the accumulated value of a duration during which the app is activated (an accumulated launch time), or any combination thereof.

For example, when there are multiple suggestion candidates which are shortcuts 40 satisfying the second criterion, image controller 120 may reference the launch information on each of the apps corresponding to the suggestion candidates, and identify one app having the longest accumulated launch time. With this, for example, shortcut 40 of the app launched many times and used by a user for a long time is selected as the second shortcut. In other words, when there are suggestion candidates which are each shortcut 40 satisfying the second criterion, image controller 120 may further identify, with reference to the launch information, from among some of the application programs associated with the suggestion candidates, one application program having the launch time satisfying a third criterion. Even in this case, it is possible to efficiently refine the shortcuts suggested to be added to home menu 30.

Furthermore, the launch information on a time when the app has been launched may be used not only to refine the suggestion candidates but also to select a suggestion candidate. In other words, image controller 120 may determine, with reference to the launch information, that shortcut 40 associated with an application program having a launch time-related value satisfying a predetermined condition, and satisfying the condition that the suggestion count is less than or equal to M satisfies the second criterion.

In other words, the launch information on a time when the app associated with its shortcut 40 has been launched may be used as the condition of being possible shortcut 40 suggested to be added to home menu 30. For example, it may be determined, based on a comparison result between the predetermined threshold and any one of the date and time when the app has been launched first, the duration between the time when the app has been launched first and the time when the app has been launched most recently, and the accumulated value of a duration during which the app is activated, or any combination thereof, whether shortcut 40 associated with this app is regarded as a suggestion candidate or not.

Furthermore, television 10 according to this embodiment includes display device 180 for displaying an image and image output device 100. Image output device 100 may be implemented by processor 101. More specifically, when receiving a predetermined instruction, processor 101 implemented as image output device 100 selects, with reference to application information 160, from among shortcuts 40, at least one first shortcut satisfying a first criterion and a second shortcut not satisfying the first criterion but satisfying a second criterion. Processor 101 generates home menu 30 in which the at least one first shortcut selected is displayed and the second shortcut selected is displayed in a different form than the at least one first shortcut, and causes display device 180 to display the menu image. When receiving an OK instruction for the second shortcut included in home menu 30, processor 101 updates application information 160 to cause the second shortcut to satisfy the first criterion. It should be noted that storage 150 storing application information 160 may be provided inside or outside processor 101.

Thus, television 10 according to this embodiment includes image output device 100, and thus it is possible to efficiently perform the process of presenting a menu image (home menu 30) showing a set of shortcuts suitable for a user.

Furthermore, a method of controlling image output device 100 according to this embodiment is a method of controlling image output device 100 that outputs a generated image to display device 180. The method includes: receiving an instruction from a user (S100); generating and outputting, with image generator 130, home menu 30 in which at least one of shortcuts 40 each associated with a different one of application programs is displayed, home menu 30 being arranged in at least a part of a display area of display device 180 (S112); updating application information 160 including information on shortcuts 40 (S113); and when a predetermined instruction has been received in the receiving (S100), selecting, with reference to application information 160, from among shortcuts 40, at least one first shortcut satisfying a first criterion and a second shortcut not satisfying the first criterion but satisfying a second criterion (S102 through S104, S111). In the generating and outputting (S109, S112), home menu 30 in which the at least one first shortcut selected is displayed and the second shortcut selected is displayed in a different form than the at least one first shortcut is generated and outputted. In the updating (S113), when an OK instruction for the second shortcut included in home menu 30 has been received in the receiving (S100), application information 160 is updated to cause the second shortcut to satisfy the first criterion.

As described above, this control method prevents shortcut 40 from being forced to be added to home menu 30 against user's will or despite the intention of a user. Accordingly, a user need not perform an additional operation which is unnecessary under the true condition, such as deleting shortcut 40 forced to be added to home menu 30 by manual. In other words, an unnecessary process under the true condition, which associates with this additional operation, does not occur in image output device 100 that generates and outputs home menu 30. Thus, the method of controlling image output device 100 according to this embodiment efficiently performs the process of presenting a menu image (home menu 30) showing a set of shortcuts suitable for a user.

It should be noted that the present disclosure may be implemented as a computer program for causing a computer to execute the steps included in the foregoing control method, or a computer-readable recording medium with the computer program recorded thereon.

OTHER EMBODIMENTS

The foregoing embodiment has been described as an example of technique disclosed in this application. However, the technique of the present disclosure is not limited to this embodiment. The present disclosure is also applicable to embodiments optionally involving modification, replacement, addition, and omission. The components described in the foregoing embodiment may be combined to achieve another embodiment.

For example, in the foregoing embodiment, one second shortcut (i.e. shortcut 40 displayed as suggested shortcut 41) is displayed in home menu 30. However, two or more second shortcuts may be displayed in home menu 30. For example, when multiple shortcuts 40 are selected as suggestion candidates by image controller 120, image generator 130 may generate and output home menu 30 in which these shortcuts 40 are displayed as suggested shortcuts 41. Even in this case, for example, the number of suggested shortcuts 41 displayed in home menu 30 is limited to a predetermined value, and thereby it is possible to prevent the appearance of home menu 30 from being complicated. Furthermore, for each of suggested shortcuts 41, a user can determine whether suggested shortcut 41 is actually added to home menu 30 or not.

Furthermore, for example, in FIG. 5, the maximum number of shortcuts 40 displayed in home menu 30 is 4. However, the maximum number of shortcuts 40 displayed in home menu 30 may be 5 or more. For example, a lot of shortcuts 40, e.g. 50 shortcuts, may be displayed in the display area of home menu 30 by enabling horizontal scrolling of home menu 30.

Furthermore, suggested shortcut 41 is displayed larger than other shortcuts 40 and suggestion mark 35 is added to suggested shortcut 41, and thereby suggested shortcut 41 is displayed in a different form than other shortcuts 40. However, an approach to make a difference in form between suggested shortcut 41 and other shortcuts 40 is not limited to the addition of suggestion mark 35, etc.

For example, when shortcut 40d shown in FIG. 5 is displayed as suggested shortcut 41, other shortcuts 40 may be displayed in a fixed state whereas shortcut 40d may be displayed in a vibrating state. Furthermore, a focus with a color or shape different from normal focus 32 is applied to shortcut 40d, and thereby shortcut 40d may be displayed as suggested shortcut 41.

Furthermore, in this embodiment, as shown in FIG. 4, home menu 30 is displayed in a part of the display area of display device 180. However, home menu 30 may be displayed in the entire display area of display device 180. Furthermore, in this case, the TV program which has been displayed on display device 180 before home menu 30 is displayed may be displayed as a part of home menu 30.

Furthermore, image output device 100 may be provided with a device different from television 10. For example, image output device 100 may be provided with various devices including a recorder for recording a TV program, etc., a player supporting a recording medium such as a DVD or BD, a set top box for receiving a broadcast signal such as a cable television broadcast to convert it to a signal viewable on a television, a personal computer (PC), a video camera, and a mobile terminal.

As described above, other embodiments have been described as examples of the technique in the present disclosure. The accompanying drawings and the detailed descriptions have been provided for this.

Accordingly, in order to illustrate the foregoing technique, the components described in the accompanying drawings and the detailed descriptions may include not only components required to solve the problems but also components not required to solve the problems. For this reason, the components described in the accompanying drawings and the detailed descriptions should not be always regarded as being necessary to solve the problem.

The foregoing embodiments are for illustrative purposes of the technique of the present disclosure, and thus claims or the equivalent scope thereof may involve modification, replacement, addition, and omission in various ways.

INDUSTRIAL APPLICABILITY

The present disclosure is applicable to an image output device capable of efficiently performing a process related to a presentation of a menu image showing a set of shortcuts suitable for a user. In particular, the present disclosure is applicable to electronics such as a television, a PC, a server, a mobile terminal, a video camera, a video recorder, etc.

The invention claimed is:

1. An image output device that outputs a generated image to a display device, the image output device comprising:
   an instruction receiver that receives an instruction from a user;
   an image generator that generates and outputs a menu image in which at least one of a plurality of shortcuts each associated with a different one of a plurality of application programs is displayed, the menu image being arranged in at least a part of a display area of the display device;
   an image controller that controls the image generator;
   a storage that stores application information including information on the plurality of shortcuts; and
   an updater that updates the application information, wherein
   when the instruction receiver has received a predetermined instruction, the image controller selects, with reference to the application information, from among the plurality of shortcuts, at least one first shortcut satisfying a first criterion and a second shortcut not satisfying the first criterion but satisfying a second criterion,
   the image generator generates and outputs the menu image in which the at least one first shortcut selected is displayed and the second shortcut selected is displayed in a different form than the at least one first shortcut,
   when the instruction receiver has received an OK instruction for the second shortcut included in the menu image, the updater updates the application information to cause the second shortcut to satisfy the first criterion,
   the application information includes, for each of the plurality of shortcuts, suggestion count information indicating a suggestion count which is a total number of times that each shortcut has been selected as the second shortcut by the image controller,
   the image controller determines, with reference to the suggestion count information, that a shortcut satisfying a condition that the suggestion count is less than or equal to M satisfies the second criterion, M being an integer greater than or equal to 1, and
   the updater further updates the suggestion count information to increment the suggestion count associated with the second shortcut selected by the image controller.

2. The image output device according to claim 1, wherein
   the application information includes launch information indicating a launch count which is a total number of times that each of the plurality of application programs has been launched,
   the image controller determines, with reference to the launch information, that a shortcut associated with an application program having the launch count higher than N, and satisfying the condition that the suggestion count is less than or equal to M satisfies the second criterion, N being an integer greater than or equal to 0, and
   the updater further updates the launch information to clear the launch count of an application program associated with the second shortcut selected by the image controller.

3. The image output device according to claim 1, wherein
   the application information includes launch information on a launch time which is a time when each of the plurality of application programs has been launched, and
   the image controller determines, with reference to the launch information, that a shortcut associated with an application program having a launch time-related value satisfying a predetermined condition, and satisfying the condition that the suggestion count is less than or equal to M satisfies the second criterion.

4. An image output device that outputs a generated image to a display device, the image output device comprising:
   an instruction receiver that receives an instruction from a user;
   an image generator that generates and outputs a menu image in which at least one of a plurality of shortcuts each associated with a different one of a plurality of application programs is displayed, the menu image being arranged in at least a part of a display area of the display device;
   an image controller that controls the image generator;
   a storage that stores application information including information on the plurality of shortcuts; and
   an updater that updates the application information, wherein
   when the instruction receiver has received a predetermined instruction, the image controller selects, with reference to the application information, from among the plurality of shortcuts, a second shortcut not satisfying a first criterion but satisfying a second criterion,
   the image generator generates and outputs the menu image in which the second shortcut selected is displayed in a different form than a first shortcut satisfying the first criterion, and
   when the instruction receiver has received an OK instruction for the second shortcut included in the menu image, the updater updates the application information to cause the second shortcut to satisfy the first criterion,
   the application information includes, for each of the plurality of shortcuts, suggestion count information indicating a suggestion count which is a total number of times that each shortcut has been selected as the second shortcut by the image controller,
   the image controller determines, with reference to the suggestion count information, that a shortcut satisfying a condition that the suggestion count is less than or equal to M satisfies the second criterion, M being an integer greater than or equal to 1, and the updater further updates the suggestion count information to increment the suggestion count associated with the second shortcut selected by the image controller.

5. The image output device according to claim 4, wherein the application information includes launch information indicating a launch count which is a total number of times that each of the plurality of application programs has been launched, the image controller determines, with reference to the launch information, that a shortcut associated with an application program having the launch count higher than N, and satisfying the condition that the suggestion count is less than or equal to M satisfies the second criterion, N being an integer greater than or equal to 0, and the updater further updates the launch information to clear the launch count of an application program associated with the second shortcut selected by the image controller.

6. The image output device according to claim 4, wherein the application information includes launch information on a launch time which is a time when each of the plurality of application programs has been launched, and the image controller determines, with reference to the launch information, that a shortcut associated with an application program having a launch time-related value satisfying a predetermined condition, and satisfying the condition that the suggestion count is less than or equal to M satisfies the second criterion.

* * * * *